United States Patent Office 3,365,409
Patented Jan. 23, 1968

3,365,409
VINYL ACETATE-ACRYLAMIDE COPOLYMER EMULSIONS
Raymond Lanthier, Shawinigan, Quebec, Canada, assignor to Shawinigan Chemicals Limited, Montreal, Quebec, Canada, a corporation of Canada
No Drawing. Filed Oct. 18, 1965, Ser. No. 497,509
11 Claims. (Cl. 260—29.6)

ABSTRACT OF THE DISCLOSURE

Stable aqueous low viscosity emulsions of random copolymers of vinyl acetate and 6–15% acrylamide by weight of vinyl acetate. The emulsions are prepared by a delayed addition emulsion polymerization technique wherein specific proportions of the total amounts of ingredients are present in the initial charge, the addition of the remaining proportions being at controlled rates. A particular redox catalyst system of a vinyl acetate soluble organic hydroperoxide initiator and a water soluble reducing agent activator, a stable water soluble buffering agent and, optionally, an emulsifying agent are used in carrying out the polymerization, the temperature being maintained below about 55° C.

---

This invention relates to stable aqueous dispersions or emulsions of vinyl acetate-acrylamide copolymers and the preparation thereof, and more particularly to such copolymers which are random copolymers of vinyl acetate and acrylamide.

It is known that vinyl acetate and acrylamide can be copolymerized, and that such copolymers can to some extent be made by polymerization in aqueous medium to produce the copolymer dispersions conventionally referred to as emulsions. Such copolymer emulsions are potentially valuable as adhesives, e.g., wood-bonding adhesives, as the acrylamide functions in the copolymer both to increase its rigidity and to provide opportunities for cross-linking which can further increase the rigidity of adhesive bonds. However, because of the water solubility of polyacrylamide, there is a significant degree of water solubility in acrylamide copolymers containing extensive chains of acrylamide units in their structure, which solubility makes aqueous dispersions of such copolymers highly viscous.

The copolymerization of vinyl acetate and acrylamide can theoretically occur in any of three well recognized ways, viz.:

(1) block copolymerization, in which the monomers each form blocks of monomer units which link together to form polymeric chains of homogeneous blocks or chains of monomer units,
(2) graft copolymerization, in which one monomer polymerizes as a chain growing on a polymer chain of the other monomer, and
(3) random copolymerization, in which the monomer units each add randomly onto growing copolymer chains substantially in proportion to their relative concentrations as monomer, so that units of the monomer present in minor proportion are spaced substantially evenly along the chains of copolymer.

Because of the aforementioned hydrophilic nature of polymeric chains of acrylamide units, both block and graft copolymers of vinyl acetate and acrylamide have strong hydrophilic properties, and emulsions of such copolymers containing 50–60°% solids, the usual proportion for commercial resin emulsions, can be obtained only with proportions of acrylamide up to about 5% by weight of the vinyl acetate. Attempts to prepare emulsions of such copolymers containing significantly more than 5% of acrylamide, by weight of the vinyl acetate, have produced only highly viscous compositions unsuitable as emulsions and the more viscous of which set to solid gels as polymerization proceeds.

It is believed that, in contrast to the block and graft copolymers of vinyl acetate and acrylamide, the random copolymers can contain between 6% and 15% of acrylamide units, by weight of the vinyl acetate, without developing such strong hydrophilic nature as to form unduly viscous compositions or solid gels when formed in aqueous dispersion.

It is an object of this invention to prepare aqueous emulsions of copolymers of vinyl acetate and acrylamide having such relatively high proportions of acrylamide in the copolymer, i.e. between 6 and 15% by weight of the vinyl acetate, while at the same time having sufficiently low viscositiy to be suitable for normal use as emulsions, especially in adhesives and in paper coatings.

The object of the invention is achieved by copolymerizing specific proportions of vinyl acetate and acrylamide in an aqueous medium with a particular catalyst system at a suitable pH in a suitable temperature range and with addition of the ingredients to the polymerization medium in a manner that precludes undesired homopolymerization of either monomer. By the process of the invention, it is found possible to prepare vinyl acetate-acrylamide copolymer emulsions with up to nearly 70% solids content.

The invention thus consists in a process for preparing an aqueous emulsion of a random copolymer of vinyl acetate and acrylamide, which copolymer contains between 6% and 15% of acrylamide by weight of the vinyl acetate, said process comprising:

(1) establishing an initial aqueous polymerization medium containing:
    (a) a major proportion of the water for the aqueous emulsion being prepared,
    (b) a proportion of between 0% and 25% of the total amount of acrylamide to be copolymerized, said total amount being between 6% and 15% by weight of the vinyl acetate to be copolymerized,
    (c) a proportion of less than 10% of the total amount of vinyl acetate to be copolymerized, said vinyl acetate containing dissolved therein a proportion of an organic hydroperoxide initiator of a redox polymerization catalyst system, and
    (d) an amount, between 0% and 1% by weight of the vinyl acetate, of an emulsifying agent effective to emulsify the vinyl acetate in the aqueous medium, (2) while maintaining the aqueous polymerization medium continuously agitated and at a temperature at least 10° C. below the reflux temperature thereof, and preferably in the range 40–45° C., slowly and simultaneously adding as separate ingredients to the aqueous medium to form a polymerization mixture:
    (a) an aqueous solution of the remainder of the acrylamide to be copolymerized,
    (b) the remainder of the vinyl acetate to be copolymerized, said vinyl acetate containing an additional proportion of said organic hydroperoxide initiator, and
    (c) an aqueous solution containing a proportion of an activator of said redox polymerization catalyst system of the group consisting of sodium bisulfite, sodium formaldehyde sulfoxylate, and sodium metabisulfite sufficient to activate polymerization of the vinyl acetate and acrylamide by the initiator, and a proportion of a stable buffer salt sufficient to maintain the pH of the polymerization mixture in the range between 5 and 7, the rate of addition of the vinyl acetate being regulated to sustain copolymerization and maintain the temperature of the polymerization mixture at least 10° C. below the reflux temperature thereof, the rates of addition of the acrylamide and buffer solutions being proportioned to that of the vinyl acetate so that the additions are completed in substantially the same time, and the combined amounts of vinyl acetate and acrylamide used being between 50% and 70% by weight of the resutling emulsion, and (3) continuing agitation of the polymerization mixture until copolymerization of the monomers is complete, then cooling the emulsion to ambient temperature.

As indicated hereinbefore the acrylamide-vinyl acetate copolymers of the emulsions of the present invention contain between 6% and 15% of acrylamide units, by weight of the vinyl acetate. If a proportion of acrylamide less than the indicated range is used, there is not sufficient to provide the hydrophilic properties of the copolymer which enables it to form stable aqueous emulsions as copolymerization proceeds, there being no extraneous emulsion stabilizers included in the emulsions of the present invention. Emulsions made with such lower proportions are characterized by intolerable instability and the presence of grits. If a proportion greater than the indicated range is used, the hydrophilic properties of the copolymer are so strong that the emulsions containing 50–70% of copolymer by weight are too viscous for common applications of emulsions. Commercial applications of emulsions generally require that they contain over 50% polymer by weight, and the most common commercial emulsions generally contain about 55% solids. The copolymer emulsion compositions of the present invention contain a proportion of water to provide a copolymer content of 50% to 70%.

The steps of the copolymerization process of the present invention are an application of the "delayed addition" emulsion polymerization technique which has never previously been applied to copolymerization of acrylamide and vinyl acetate nor has it ever utilized the particular redox catalyst system essential to the present invention. As is well known the delayed addition technique involves initiating polymerization of a proportion of a quantity of monomer to be polymerized in an initial charge in a reactor, then gradually adding the balance of the monomer to the polymerizing medium as polymerization proceeds. In the present invention a major part of the water for the aqueous emulsion to be prepared, generally between 50% and 75% of the total water, forms part of the initial charge, together with a proportion of between 0% and 25% of the acrylamide to be copolymerized, a proportion of less than 10% of the vinyl acetate to be copolymerized, and any emulsifying agent which it is desired to include in the composition to facilitate emulsification of the vinyl acetate in the aqueous medium, such emulsifying agent not beng essential to the operation of the invention. The proportion of emulsifying agent, if one is used, conveniently is up to 1% by weight of the vinyl acetate to be emulsified. The balance of the water for the aqueous emulsion to be prepared is added gradually to the polymerizing medium as polymerization proceeds and is used as the solvent for the two solutions of water soluble ingredients which are added to the initial charge as polymerization proceeds.

The polymerization catalyst system used in the process of this invention is an example of redox type polymerization catalyst systems. However, the particular redox catalyst system required for the present invention has two ingredients one of which, the organic hydroperoxide initiator, is preferentially soluble in the vinyl acetate and the other of which, the activator, is preferentially soluble in the aqueous medium. The vinyl acetate soluble ingredient of the catalyst system is dissolved in the vinyl acetate to be copolymerized, and thus part of it forms part of the initial charge and the remainder of it is introduced gradually into the polymerizing medium with the addition of the delayed vinyl acetate during polymerization. This vinyl acetate soluble ingredient or initiator of the catalyst system is an organic hydroperoxide such as, for example, cumene hydroperoxide, diisopropylbenzene hydroperoxide, tertiary-butyl hydroperoxide, transdecalin hydroperoxide, tetralin hydroperoxide, paramenthene hydroperoxide and other organic hydroperoxide polymerization initiators known in the art. The water soluble ingredient or activator of the catalyst system is a water soluble reducing agent such as, for example, sodium bisulfite, sodium formaldehyde sulfoxylate, and sodium metabisulfite.

The proportion of the catalyst system required for the copolymerization process of the invention is in the general range of catalyst proportions used in emulsion polymerization reactions, and most preferably lies between 0.1% and 1%, by weight of the monomers to be polymerized, of each of the catalyst ingredients, viz: 0.1–1% of initiator and 0.1–1% of activator.

As previously indicated, the proportion of buffer salt required to be added to the polymerizing mixture is sufficient to maintain the pH of the polymerizing mixture between 5 and 7. Generally a proportion between 0.1% and 0.75% by weight of the polymerizing mixture, is sufficient to achieve this desideratum.

It is a critical feature of the present invention that less than 25% of the acrylamide to be copolymerized be present in the initial charge. The proportion of acrylamide in the initial charge can in fact be zero, as it has been observed that under the influence of the redox catalyst system used in the invention the acrylamide is a much more active monomer than the vinyl acetate and tends to polymerize more readily. As acrylamide constitutes only a minor proportion of the total copolymer in the present invention, it is more evenly randomly distributed along the copolymer chains when its addition to the polymerization medium is made gradually as polymerization proceeds. However, up to about 25% of the total amount of acrylamide to be copolymerized can be in the initial charge in which polymerization starts substantially as soon as a small proportion of each of the two ingredients of the catalyst system is present. If a proportion greater than 25% of the acrylamide to be copolymerized is present in the initial charge, there is a large amount of it that is block or graft copolymerized; the block or graft copolymer is comparatively so hydrophilic that the polymerizing medium becomes too thick and viscous and a suitable stable emulsion of copolymer cannot be formed. Preferably between 0% and 5% of the acrylamide is in the initial charge.

It is an additional critical feature of the present invention that a proportion of not more than 10% of the total amount of vinyl acetate to be copolymerized be present in the initial charge. At least part of the vinyl acetate must be in the initial charge so that polymerization will start promptly at the indicated polymerization temperature on the addition of the water soluble ingredient of the catalyst system to the polymerizing medium. However, if more than about 10% of the vinyl acetate is present in the initial charge, the amount of monomer polymerizing, when polymerization initially starts, may be so great as to cause the temperature to rise suddenly beyond the designated limit; polymerization at temperatures above the designated maximum produces grainy unstable emulsions containing many grits which are undesirable. Preferably between 5% and 10% of the vinyl acetate is present in the initial charge.

Another critical feature of the present invention is the temperature at which the copolymerization is conducted. As indicated above, this must be at least ten degrees below the reflux temperature of the polymerizing mixture, the reflux temperature of water-vinyl acetate mixtures being in the neighborhood of 65° C. Thus the temperature of the copolymerizations should be maintained below about 55° C. and most preferably are conducted in the range 40–45° C., as grits tend to form at higher temperatures. Temperatures lower than about 40° C. are suitable but are difficult to achieve with ordinary cooling water as the cooling facility for regulating the polymerization temperature; they can be achieved and used with additional cooling capacity provided by refrigeration, but such extra facility is expensive and unnecessary when ordinary cooling water can be used to maintain the polymerization temperature in the readily operable range of 40–55° C. The rate of addition of the delayed monomers is regulated to sustain the copolymerization and maintain the temperature thereof in the operable range with the cooling facility available for the reaction. With a fixed cooling capacity, increasing the rate of addition tends to raise the temperature in the copolymerizing mixture as exothermic heat of copolymerization is released at an increasing rate, and decreasing the rate of addition tends to lower the temperature, as is well known in the art of delayed addition emulsion polymerization.

Still another critical feature of the invention is the presence in the aqueous polymerizing medium of a proportion of a stable water soluble buffer to maintain the pH of the medium between 5 and 7. Particularly suitable salts for this are borax and disodium hydrogen phosphate, but other stable buffer salts can be used. Sodium bicarbonate is not a stable buffer salt, as it can evolve carbon dioxide which becomes lost from the polymerizing medium, thereby interrupting the buffering action.

An optional feature of the invention is the presence of a wetting agent in the aqueous medium. A wetting agent in the initial charge increases the degree of dispersion of the initial vinyl acetate in the aqueous medium, and tends to decrease the average particle size of the vinyl acetate monomer droplets and the ensuing copolymer particles. It additionally has some effect on the viscosity of the copolymer emulsion product, the presence of a wetting agent tending to raise the viscosity of the emulsion as compared to an emulsion containing no wetting agent. Suitable wetting agents are, for example, the polyethyleneoxy phosphate esters sold under the trade name "Gafac," a purified 98% dodecyl benzene sodium sulfonate powder anionic wetting agent sold under the trade name "Siponate DS10," a 30% aqueous solution of an alkyl aryl sodium sulfonate anionic wetting agent sold under the trade name "Santomerse S," and a 35% solution of gamma-stearamidopropyldimethyl - beta - hydroxy ammonium dihydrogen phosphate in isopropanol-water mixture which is the catonic wetting agent sold under the trade name "Cationic SP."

Proportions of wetting agent between 0.1% and 0.75% by weight of the vinyl acetate are preferred when one is used, and up to 1% is satisfactory. Higher proportions are unnecessary and undesirable as at least some of them tend to affect the viscosity of the emulsion product.

The invention is more specifically illustrated by the following examples which are given to exemplify but not to limit the scope thereof.

EXAMPLE 1

In a one liter glass emulsion polymerization kettle, equipped with a large blade stirrer, thermometer, water condenser, three dropping funnels, and an inlet and outlet for a stream of inert gas, were placed 250 gm. water, 1.0 gm. "Gafac PE–510" (a polyethyleneoxy phosphate ester anionic surfactant), and 10.0 gm. acrylamide to form an aqueous phase into which 30 gm. of vinyl acetate containing 0.5 ml. tert.-butyl hydroperoxide were dispersed; the ingredients were dispersed by agitation while a continuous stream of nitrogen was passed through the kettle. The temperature of the mixture was brought to 40° C., then the slow addition of each of the following solutions was initiated, viz: a solution of 2.0 gm. sodium bisulphite and 2.0 gm. disodium hydrogen phosphate in 50 ml. water, a solution of 30.0 gm. acrylamide in 70 ml. water, and a solution of 1.5 ml. tert.-butyl hydroperoxide in 348 gm. of vinyl acetate. Addition of each of the solutions was continued at rates that completed the additions in substantially the same time of three hours. Copolymerization of the monomers was noted to commence shortly after addition of the solutions was started, as evidenced by a whitening of the dispersion and a tendency for increasing temperature in the kettle which was precluded by a cooling bath around the kettle. Agitation and 40° C. temperature was maintained throughout the additions and for an hour subsequent thereto, then the resulting copolymer emulsion was cooled to room temperature, filtered through a stainless steel screen having 0.25 mm. opening, and its properties determined. The emulsion was a smooth, creamy, stable aqueous dispersion of an acrylamide-vinyl acetate copolymer containing 10.6% acrylamide by weight of the vinyl acetate and was found to contain 54.02% (w./w.) solids and 0.08% by weight residual vinyl acetate monomer. It had a pH of 6.6 and viscosity at 20° C. of 117 poises as measured with a Brookfield Syncrolectric, viscosimeter using No. 5 spindle at 20 r.p.m. The emulsion was smooth and free from grits (coarse hard lumps of coagulated polymer particles). Used as an adhesive to bond two blocks of hardwood, it had superior strength when tested by the method hereinafter described for testing wood bond strengths.

EXAMPLE 2

In a 200 liter stainless steel emulsion kettle equipped with a cooling jacket, variable speed anchor-shaped stirrer, inert gas purging lines, and essential liquid feed lines connected to liquid feed pumps was placed an initial charge of 94.4 lbs. (42.7 kg.) water, 0.38 lb. (0.173 kg.) "Gafac PE–510" (polyethyleneoxy phosphate ester) emulsifier, and 11.3 lbs. (5.13 kg.) vinyl acetate containing 0.18 lb. (81.6 gm.) tert.-butyl hydroperoxide dissolved therein. The kettle was flushed with nitrogen and a continuous slow stream thereof was maintained through the kettle for the duration of the polymerization. The initial charge was dispersed by stirring at a stirrer speed of about 225 r.p.m. which likewise was maintained throughout the polymerization. Temperature of the initial charge was raised to 40° C., then the slow simultaneous addition of three solutions to the kettle was started by means of three pumps, the solutions being (a) 11.3 lbs. (5.13 kg.) acrylamide dissolved in 26.4 lbs. (11.96 kg.) water; (b) 0.75 lb. (0.34 kg.) each of sodium bisulfite and sodium hydrogen phosphate dissolved in 18.9 lbs. (8.57 kg.) water; and (c) 0.56 lb. (0.26 kg.) tert.-butyl hydroperoxide dissolved in 135 lbs. (61.2 kg.) vinyl acetate.

The temperature in the kettle was regulated to between 38 and 42° C. by the cooling jacket, and the rates of addition of the solutions regulated for uniform flows so that the acrylamide solution addition was finished after three hours and twenty minutes, the vinyl acetate solution finished fifteen minutes later, and the solution of salts another fifteen minutes later. Stirring and temperature were maintained for another hour, then the resulting emulsion was cooled to room temperature and its properties determined. The emulsion was a smooth, creamy, stable aqueous dispersion of an acrylamide-vinyl acetate copolymer containing 7.73% acrylamide by weight of the vinyl acetate; it had a solids content of 51.8% (w./w.), a residual monomeric vinyl acetate content of 0.099%, a pH of 6.1 and a viscosity at 20° C. of 40 poises. The average size of the copolymer particles in the emulsion, as measured using electron microscope photomicrographs, was 0.07 micron.

EXAMPLE 3

In a one liter glass polymerization kettle, equipped as described in Example 1 except for substitution of two small proportioning pumps and feed lines for the two dropping funnels feeding the aqueous solutions, were placed 200 gm. water and 30 gm. vinyl acetate containing 0.5 ml. tert.-butyl hydroperoxide dissolved therein. These ingredients were dispersed by stirring and heated to 40° C. Then simultaneous continuous slow addition of three separate solutions to the kettle by means of the proportioning pumps was started, viz: (1) a solution of 30 gm. acrylamide in 70 gm. water; (2) a solution of 2 gm. disodium hydrogen phosphate and 2 gm. sodium bisulfite in 100 gm. water; and (3) a solution of 1.5 ml. tert.-butyl hydroperoxide in 358 gm. vinyl acetate (added by dropping funnel). The temperature in the reactor was maintained at 40° C. by application of a cooling bath to the kettle as necessary. After one hour and 55 minutes the acrylamide solution had all been added; five minutes later the addition of the vinyl acetate solution was complete and two minutes still later the solution of phosphate and bisulfite salts was complete. Stirring and temperature were maintained for an additional 30 minutes, then the emulsion was cooled to room temperature and its properties determined. The emulsion was a smooth, creamy, stable aqueous dispersion of an acrylamide-vinyl acetate copolymer containing 7.74% acrylamide by weight of the vinyl acetate. It had a solids content of 54.04% (w./w.), a residual vinyl acetate monomer content of 0.10% (w./w.), and a pH of 6.6. The viscosity of the emulsion was 6.0 poises as measured at 20° C. The emulsion was free from grits and had superior strength as a wood adhesive when tested as hereinafter described.

EXAMPLE 4

In a one liter glass emulsion kettle equipped as described in Example 3 above, were placed 200 gm. water and 30 gm. vinyl acetate containing 0.5 ml. tert.-butyl hydroperoxide dissolved therein. The ingredients were dispersed by stirring and heated to 40° C. Then simultaneous continuous slow addition to the kettle of three separate solutions was started, viz: (1) a solution of 30 gm. acrylamide in 70 gm. water; (2) a solution of 2.0 gm. borax ($Na_2B_4O_7 \cdot 10H_2O$) and 2.0 gm. sodium bisulfite in 100 gm. water; and (3) 358 gm. vinyl acetate containing 1.5 ml. tert.-butyl hydroperoxide. Temperature in the kettle was maintained in the range 39–44° C. by a cooling bath during the additions and polymerization. Addition of the acrylamide solution was complete in one hour 55 minutes, that of the vinyl acetate in two hours, and that of the borax-bisulfite solution in two hours and five minutes. Stirring and temperature were maintained for an additional 30 minutes, then the resulting emulsion was cooled to room temperature and its properties determined. The emulsion was a stable aqueous dispersion of acrylamide-vinyl acetate copolymer containing 7.73% acrylamide by weight of the vinyl acetate. It had a solids content of 54.3% (w./w.), a residual vinyl acetate monomer content of 0.09%, and a pH of 6.3. Its viscosity at 20° C. was 4.2 poises.

EXAMPLE 5

The procedure of Example 4 above was repeated exactly except for the additional inclusion in the initial charge of 1 gm. "Gafac PE-510" emulsifier. The resulting stable emulsion had the same solids content and proportion of acrylamide in the copolymer as that obtained in Example 4: it had a pH of 6.6, a residual vinyl acetate monomer content of 0.10%, and a viscosity at 20° C. of 21.5 poises. This last property illustrates the effect of the presence of emulsifier in the emulsion as discussed previously.

EXAMPLE 6

In a one liter glass polymerization kettle equipped as described in Example 3 above were placed 200 gm. water and 30 gm. vinyl acetate containing 0.5 ml. cumene hydroperoxide dissolved therein. The ingredients were dispersed by stirring and heated to 40° C., then simultaneous continuous slow addition to the kettle of three separate solutions was started, viz: (1) a solution of 30 gm. acrylamide in 70 gm. water; (2) a solution of 2 gm. disodium hydrogen phosphate and 2 gm. sodium bisulfite in 100 gm. water; and, (3) a solution of 1.5 ml. cumene hydroperoxide in 358 gm. vinyl acetate. Temperature in the kettle was maintained in the range 40–43° C. by cooling as the additions and polymerization proceeded. Addition of the first and third solutions was completed in two hours and addition of the second solution was complete five minutes later. Stirring and temperature were maintained for an additional 30 minutes, then the resulting emulsion was cooled to room temperature and its properties determined. The emulsion was a smooth stable dispersion of acrylamide-vinyl acetate copolymer containing 7.7% acrylamide by weight of the vinyl acetate. It had a solids content of 54.05% (w./w.), a residual vinyl acetate monomer content of 0.30% and a pH of 6.4. The viscosity of the emulsion at 20° C. was 1.3 poises.

EXAMPLE 7

In a one liter glass polymerization kettle, equipped as described in Example 3 above, were placed 200 gm. water and 30 gm. vinyl acetate containing 0.5 ml. tert.-butyl hydroperoxide dissolved therein. The ingredients were dispersed by stirring and heated to 40° C., then simultaneous continuous slow addition to the kettle of three separate solutions was started, viz: (1) a solution of 50 gm. acrylamide in 70 gm. water; (2) a solution of 2 gm. disodium hydrogen phosphate and 2 gm. sodium bisulfite in 100 gm. water; and (3) a solution of 1.5 gm. tert.-butyl hydroperoxide in 338 gm. vinyl acetate. Temperature in the kettle was maintained in the range 40–42° C. as the additions and polymerization proceeded. Addition of the acrylamide solution was complete in one hour 55 minutes, addition of the vinyl acetate solution was complete five minutes later, and of the phosphate and bisulfite solution another ten minutes later. Stirring and temperature were maintained for an additional 30 minutes, then the resulting emulsion was cooled to room temperature and its properties determined. The emulsion was a smooth grit-free stable dispersion of acrylamide-vinyl acetate copolymer containing 13.6% acrylamide by weight of the vinyl acetate. The emulsion had a solids content of 54.02% (w./w.), a residual vinyl acetate monomer content of 0.11%, and a pH of 6.7. The viscosity of the emulsion at 20° C. was 71.0 poises.

EXAMPLE 8

In a one liter glass polymerization kettle equipped as described in Example 3 above, were placed 200 gm. water and 30 gm. vinyl acetate containing 0.5 ml. tert.-butyl hydroperoxide dissolved therein. The ingredients were dispersed by stirring and heated to 40° C., then simultaneous continuous slow addition to the kettle of three separate solutions was started, viz: (1) a solution of 38.6 gm. acrylamide in 70 gm. water; (2) a solution of 2 gm. disodium hydrogen phosphate and 2 gm. sodium bisulfite in 100 gm. water; and (3) a solution of 1.5 ml. tert.-butyl hydroperoxide in 486.4 gm. vinyl acetate. Temperature in the kettle was maintained in the range around 40° C. as the additions and polymerization proceeded. Addition of the acrylamide solution was completed in two hours, addition of the vinyl acetate solution was complete two minutes later, and of the phosphate and bisulfite solution another eight minutes later. Stirring and temperature were maintained for an additional 20 minutes, then the resulting emulsion was cooled to room temperature and its properties determined. The emulsion was a smooth grit-free stable dispersion of acrylamide-vinyl acetate copolymer containing 7.5% acrylamide by weight of the vinyl acetate. The emulsion had a solids content of 60.0% (w./w.), a residual vinyl acetate monomer content of 0.11% and a pH of 6.8. The viscosity of the emulsion at 20° C. was 14.0 poises.

EXAMPLE 9

In a one liter glass polymerization kettle, equipped as described in Example 3 above, were placed 135 gm. water and 30 gm. vinyl acetate containing 0.5 ml. tert.-butyl hydroperoxide dissolved therein. The ingredients were dispersed by stirring and heated to 40° C., then simultaneous continuous and slow addition to the kettle of three separate solutions was started, viz: (1) a solution of 36.7 gm. acrylamide in 70 gm. water; (2) a solution of 2 gm. disodium hydrogen phosphate and 2 gm. sodium bisulfite in 100 gm. water; and (3) a solution of 1.5 ml. tert.-butyl hydroperoxide in 548.3 gm. vinyl acetate. Temperature in the kettle was maintained in the range around 40° C. as the additions and polymerization proceeded. Addition of the acrylamide solution was complete in two hours 55 minutes, addition of the vinyl acetate solution was complete three minutes later, and of the phosphate and bisulfite solution another 12 minutes later. Stirring and temperature were maintained for an additional 30 minutes, then the resulting emulsion was cooled to room temperature and its properties determined. The emulsion was a smooth, grit-free, stable dispersion of acrylamide-vinyl acetate copolymer containing 6.35% acrylamide by weight of the vinyl acetate. The emulsion had a solids content of 65.0% (w./w.), a residual vinyl acetate monomer content of 0.23% and a pH of 7.0. The viscosity of the emulsion was 408 poises at 20° C.

EXAMPLE 10

The procedure of Example 3 was repeated except that 2 gm. sodium metabisulphite was substituted for the 2 gm. of sodium bisulphite used in Example 3, and the amount of delayed vinyl acetate added was 378 gm. in lieu of 358 gm. used in Example 3. The resulting emulsion was a smooth, creamy, stable, aqueous dispersion of the acrylamide-vinyl acetate copolymer containing 7.35% acrylamide by weight of the vinyl acetate. It had a solids content of 55% (w./w.), a residual vinyl acetate monomer content of 0.14%, and a pH of 6.3. The viscosity of the emulsion was 3.25 poises measured at 20° C.

EXAMPLE 11

A series of four polymerizations similar to that described in Example 3 was carried out but using varying proportions of catalyst in lieu of the proportions used in Example 3, viz: (a) 0.5 ml. tert.-butyl hydroperoxide and 0.5 gm. sodium bisulfite; (b) 1.0 ml. tert.-butyl hydroperoxide and 1.0 gm. sodium bisulfite; (c) 3.0 ml. tert.-butyl hydroperoxide and 3.0 gm. sodium bisulfite; and (d) 4.5 ml. tert.-butyl hydroperoxide and 4.0 gm. sodium bisulfite. These proportions thus ranged between 0.11% and about 1% of each of the catalyst ingredients by weight of the monomers to be copolymerized. In each case smooth, stable dispersions of acrylamide-vinyl acetate copolymer were obtained, indicating that the normal proportions of organic hydroperoxide initiator and water soluble reducing agent activator used in emulsion polymerization are suitable for the copolymerization of this invention.

The foregoing examples illustrate specific embodiments of this invention which can be distinguished from emulsions of acrylamide-vinyl acetate copolymers of the prior art by numerous comparisons and contrasts. To permit appropriate comparisons and contrast, a sample of an emulsion of an acrylamide-vinyl acetate copolymer was prepared utilizing the one liter scale polymerization equipment hereinbefore described and the following procedure, already disclosed in the art.

Into the one liter glass polymerization kettle were placed 300 gm. water, 15 gm. acrylamide, 100 ml. (93.4 gm.) vinyl acetate, and 0.8 gm. potassium persulfate polymerization catalyst. The mixture was dispersed by stirring and heated to reflux which began at 63° C. Heating and agitation were maintained to sustain the reflux during the next 50 minutes during which the temperature rose to 80° C. This temperature was maintained for the next hour during which an additional amount of 200 ml. (186.8 gm.) vinyl acetate was slowly and uniformly added to the kettle at a rate which sustained gentle reflux. The resulting emulsion was allowed to cool to room temperature and its properties determined. The emulsion was a viscous albeit stable dispersion of an acrylamide-vinyl acetate copolymer containing 5.34% acrylamide by weight of the vinyl acetate. The emulsion had a solids content of 54.0% (w./w.), a residual vinyl acetate monomer content of 0.14% and a pH of 2.6. The viscosity of the emulsion was 155 poises. The emulsion was indicative of the acrylamide-vinyl acetate copolymer emulsions prepared by the prior art, for example Canadian Patent 673,896, and for brevity is hereinafter referred to as Emulsion PA.

Infra-red spectra of the acrylamide-vinyl acetate copolymers of Emulsion PA and the emulsions made by the present invention, as illustrated in the examples, are substantially identical. The acrylamide functions or groups in the copolymer, at least in proportion up to 15% by weight of the vinyl acetate in the copolymer, produce substantially identical infra-red spectra whether the acrylamide units are present as graft copolymer, block copolymer, or random copolymer. It had not been possible therefore to distinguish random copolymers of acrylamide-vinyl acetate on the basis of their infra-red spectra. However, it has been possible to distinguish the vinyl acetate-acrylamide copolymers of the present invention from the copolymers of the prior art by their solubility in certain liquids and particularly in a mixture of 25% by weight water and 75% by weight acetone.

It was established in Canadian Patent 673,896 that the acrylamide-vinyl acetate copolymers disclosed therein were insoluble in water. This has been confirmed and a sample of the copolymer from Emulsion PA described above has been extracted with water in a Soxhlet apparatus and found to be substantially insoluble. Samples of the polymer from Emulsion PA were likewise found to be substantially insoluble in acetone and in mixtures of acetone/water 75/25 w./w. In contrast to such insolubility, the acrylamide-vinyl acetate copolymers made by the present invention are found to have a significant but limited solubility in water and in acetone as measured by extraction of samples of the copolymers in Soxhlet apparatus. The limited solubility is observable from the precipitation which occurs as recycling solvent dissolves copolymer from the initial sample in a Soxhlet extractor and transfers it to the reboiler thereof where the solvent begins to turn cloudy as copolymer accumulates therein. More startling a contrast between the copolymers of the present invention and those of the prior art is observable however in their relative solubilities in an acetone/water mixture, 75/25 w./w. The prior art copolymers are insoluble in such a mixture, as indicated above. The copolymers made by the present invention can be dissolved completely in such an acetone/water mixture to form clear solutions, and the dissolution is so rapid that it can be achieved as rapidly as measured amounts of solvent can be added to a copolymer sample from a laboratory burette. This solubility of the copolymers is demonstrated in the following manner referred to as the "Solubility Test."

A sample of an emulsion of acrylamide-vinyl acetate copolymer of measured copolymer solids content is weighed into a flask, the weight of sample being adjusted so that it contains 5 grams of copolymer solids. Water is added to the sample in the flask from a burette in an amount which, combined with the water in the sample of emulsion provides a total of 25 grams of water in the flask. Acetone of known density is then added to the flask from a burette to provide 75 grams of acetone in the flask, the sample being gently agitated by shaking while the liquids are being added, and dissolution of the sample noted.

Samples of the emulsions made in each of Examples 1 to 11 inclusive above, each being a sample of the copolymers of the present invention, all were found to dissolve quickly and completely to give clear watery solutions when tested by the Solubility Test described above. In contrast, a sample of the Emulsion PA, described above, formed an opaque viscous gelatinous mass when solubility of the copolymer was tested by the Solubility Test, indicating entirely different solubility characteristics and hence obviously different structure of the copolymer, since it contains the same monomeric units in proportions not significantly different in reference to solubility of the copolymers.

A practical advantage of the emulsions of the present invention as compared with those of the prior art lies in the greater wood bond strengths of the emulsions when they are used as wood adhesives. The wood bond strengths of the emulsions have been measured by the following method for comparison.

Two pieces of smooth planed maple hardwood 1 inch x 1¼ x ½ inch were coated on surfaces 1 inch by 1 inch with the emulsion to be tested. The two coated pieces were brought into contact so that the area of contact between them was just the one inch square and they were held for one minute under pressure of the fingers of the individual conducting the test while excess emulsion equeezed out from the area under contact was removed with a spatula. The test pieces were then allowed to remain in contact at room temperature for three days, after which they were sheared by pressure applied by an hydraulic press at the edge of the blocks along the plane of the adhesive joint. The total pressure required to shear the blocks apart was recorded as the wood bond strength in pounds per square inch. Ten separate tests were conducted for each emulsion and an average of ten values obtained for the tests was taken as the average wood bond strength of the emulsion.

Illustrating the superior wood bond strength of the emulsions of the present invention, samples of the emusion of Example 2 gave an average wood bond strength of 2960 lbs./square inch. and other samples of the same emulsion plasticized with 3% by weight of the emulsion with dibutyl phthalate plasticizer to develop optimum adhesion, gave an average wood bond strength of 4377 lbs./square inch, whereas samples of Emulsion PA, previously described gave an average wood bond strength of 3471 lbs./square inch and samples which were plasticized with 3% by weight of the emulsion of dibutyl phthalate gave an average wood bond strength of only 3150 lbs./square inch, i.e. the plasticized copolymer of Emulsion PA did not provide as much adhesive strength as the unplasticized copolymer. This parameter illustrates another sharp distinction between the acrylamide-vinyl acetate copolymers of the prior art and those of the present invention. viz: plasticization decreases the wood bond strength of the prior art copolymers and increases the wood bond strength of the copolymers of the present invention.

As indicated previously, the "Solubility Test" described herein establishes a paramount distinction between the copolymer emulsions of the present invention and those of the prior art. Another outstanding distinction is observed in the viscosities of the emulsions of the present invention as compared to those of the prior art. Thus Emulsion PA, with only 2.73% acrylamide in its composition, had a viscosity of 155 poises, whereas the emulsion of Example 6, with 3.86% acrylamide in its composition, had a viscosity of only 1.3 poises and the emulsion of Example 7, with 6.46% acrylamide in its composition, had a viscosity of only 71.0 poises. Each of the foregoing emulsions had a total solids content of 54% and was devoid of extraneous stabilizers and surfactant (wetting agents), hence the differences in viscosities are not primarily attributable to factors other than the proportion of acrylamide in the copolymers and the nature of its incorporation in the copolymers.

Various modifications can be made in the invention as described above without departing from the scope thereof. For example, where an emulsion of plasticized copolymer is desired, it is possible, as already described, to add plasticizer to a preformed copolymer emulsion and it is also possible to add plasticizer to a polymerization mixture, e.g. dissolved in the monomeric vinyl acetate, whereby the copolymer is plasticized during copolymerization as rapidly as it forms and an emulsion of plasticized copolymer is obtained directly. Plasticizer, being nonvolatile material, increases the proportion of solids in the emulsions when added thereto. Such increase in solids content of the emulsion is found to be attained without any increase in the viscosity of the emulsion occuring, and in this way solids contents of emulsions as high as 70% are readily achieved.

Numerous other modifications of the various expedients described can obviously be made without departing from the scope of the invention which is defined in the following claims.

What is claimed is:

1. A process for preparing an aqueous emulsion of a random copolymer of vinyl acetate and acrylamide, which copolymer contains between 6% and 15% of acrylamide by weight of the vinyl acetate, comprising:
   (1) establishing an initial aqueous polymerization medium containing:
      (a) a major proportion of the water for the aqueous emulsion being prepared,
      (b) a proportion of between 0% and 25% of the total amount of acrylamide to be copolymerized, said total amount being between 6% and 15% by weight of the vinyl acetate to be copolymerized,
      (c) a part amounting to less than 10% of the total amount of vinyl acetate to be copolymerized, said vinyl acetate containing dissolved therein a proportion of an organic hydroperoxide initiator of a redox polymerization catalyst system and,
      (d) an amount, between 0% and 1% by weight of the vinyl acetate, of an emulsifying agent effective to emulsify the vinyl acetate in the aqueous medium,
   (2) while maintaining the aqueous polymerization medium continuously agitated and at a temperature at least 10° C. below the reflux temperature thereof, slowly and simultaneously adding as separate ingredients to the aqueous medium to form polymerization mixture:
      (a) an aqueous solution of the remainder of the acrylamide to be copolymerized,
      (b) the remainder of the vinyl acetate to be copolymerized, said vinyl acetate containing an additional proportion of said organic hydroperoxide initiator, and
      (c) an aqueous solution containing a proportion of an activator of said redox polymerization catalyst system, of the group consisting of sodium bisulfite, sodium formaldehyde sulfoxylate and sodium metabisulfite sufficient to activate polymerization of the vinyl acetate and acrylamide by the initiator, and a proportion of a stable buffer salt sufficient to maintain the pH of the polymerization mixture in the range between 5 and 7,
   the rate of addition of the vinyl acetate being regulated to sustain copolymerization and maintain the temperature of the polymerization mixture at least 10° C. below the reflux temperature thereof, the rates of addition of the acrylamide and buffer solutions being proportioned to that of the vinyl acetate so that the additions are completed in substantially the same time, and the combined amounts of vinyl acetate and acrylamide added being between 50% and 70% by weight of the resulting emulsion, and (3) continuing agitation of the polymerization mixture until copolymerization of the monomers is complete, then cooling the emulsion to ambient temperature.

2. A process as claimed in claim 1 in which the initial aqueous polymerization medium contains between 50% and 70% of the water for the emulsion being prepared, and between 5% and 10% of the vinyl acetate to be copolymerized.

3. A process as claimed in claim 1 in which the initial aqueous medium contains between 0% and 5% of the acrylamide to be copolymerized.

4. A process as claimed in claim 1, in which a proportion of a wetting agent, between 0.1% and 0.75% by weight of the vinyl acetate to be polymerized, is included in the initial aqueous polymerization medium.

5. A process as claimed in claim 4 in which the wetting agent is a polyethyleneoxy phosphate ester.

6. A process as claimed in claim 1 wherein the vinyl acetate used contains between 0.1% and 1%, by weight of the total of vinyl acetate and acrylamide, of the organic hydroperoxide initiator dissolved therein.

7. A process as claimed in claim 1 in which the activator of the catalyst system comprises between 0.1% and 1% by weight of the total weight of vinyl acetate and acrylamide.

8. A process as claimed in claim 1 in which the buffer salt comprises between 0.1% and 0.75% by weight of the emulsion.

9. A process as claimed in claim 8 in which the buffer salt is borax or disodium hydrogen phosphate.

10. A process as claimed in claim 1 in which the temperature is maintained in the range between 40 and 45° C.

11. A stable aqueous dispersion of an emulsion copolymerized random copolymer of vinyl acetate and acrylamide, said copolymer containing between 6% and 15% of acrylamide by weight of the vinyl acetate in the copolymer, the dispension containing between 50% and 70% by weight of solids, the copolymer being characterized by complete solubility in a 75/25 w./w. mixture of acetone and water.

References Cited

UNITED STATES PATENTS 2,886,557   5/1959   Talet _____ 260—86.1

FOREIGN PATENTS 673,896   11/1963   Canada.

GEORGE F. LESMES, *Primary Examiner.*

M. TILLMAN, *Examiner.*

W. J. BRIGGS, *Assistant Examiner.*